United States Patent [19]

Conant et al.

[11] 4,432,340

[45] Feb. 21, 1984

[54] ENERGY SAVING HEATING VESSEL

[75] Inventors: Louis A. Conant; Wilbur M. Bolton, both of Rochester; James E. Wilson, Livonia, all of N.Y.

[73] Assignee: Intertec Associates Inc., Rochester, N.Y.

[21] Appl. No.: 432,629

[22] Filed: Oct. 5, 1982

Related U.S. Application Data

[63] Continuation of Ser. No. 207,082, Nov. 14, 1980, abandoned.

[51] Int. Cl.³ .............................................. A47J 27/00
[52] U.S. Cl. .................................................... 126/390
[58] Field of Search ............... 126/375, 390, 246, 262, 126/400; 220/68

[56] References Cited

U.S. PATENT DOCUMENTS

799,744  9/1905  Mackay .
2,343,470  3/1944  Nast .
2,526,687  10/1950  Reams .
3,220,870  11/1965  Loehrke .

Primary Examiner—Samuel Scott
Assistant Examiner—Randall L. Green
Attorney, Agent, or Firm—Robert A. Gerlach; Robert J. Bird

[57] ABSTRACT

Energy saving heating vessel adapted for heating by contact with bottom surface heating means, such as a hotplate, is disclosed. The described vessels typically have a heating rate 2 to 5 times faster than a conventional glass vessel while consuming about half the energy or less. The vessel includes sidewalls of a non-metal material such as a plastic, and a composite bottom. The composite bottom has a high heating surface contact area and includes a liquid-impervious innermost film of a non-metal material of a minimal thickness to minimize its resistance to heat transfer through it, bonded to and supported by an outermost layer of a rigid good thermal conductivity material preferably a graphitic material having a conductivity at least ten times higher than the sidewalls and the inner film, such outermost layer being the hot plate contacting element. The vessel can be made in a variety of shapes adapted for use in laboratory, domestic, service and industrial applications.

12 Claims, 12 Drawing Figures

ENERGY SAVING HEATING VESSEL

This application is a continuation of U.S. application Ser. No. 207,082 filed Nov. 14, 1980, now abandoned, which in turn is a continuation-in-part of U.S. application Ser. No. 112,081 filed Jan. 14, 1980, now abandoned.

FIELD OF THE INVENTION

The invention relates to energy saving heating vessels useful generally in laboratory, industrial, service and domestic fluid heating applications in the form of laboratory ware, heating tanks, cooking utensils, and fluid heating equipment generally.

DESCRIPTION RELATING TO THE PRIOR ART

It is estimated that there are well over 30 million glass and glass-ceramic vessels in use in the United States today. These include vessels for coffee, tea, water, etc., also laboratory ware including a variety of beakers and flasks. It is further estimated that about 15 to 20 percent of these vessels are heated on various types of contact heating surfaces, such as those of electric hot plates, ranges, etc., and that there are about 4.5 million such hot plates in use. These hot plates typically have power ratings of about 300 to 4000 watts for laboratory and industrial vessels, and about 1200 to 3600 for commercial and home use. At an average hot plate rating of 1500 watts, and average "on time" of about 3 hours, the total electrical energy consumed by such heaters amounts to over 20 million kilowatt hours per day or 7.4 billion kilowatt hours per year, a truly significant amount of energy.

The relatively large wattage required in these hot plates is due primarily to the following: (1) the nature of the material heated, which usually is mostly water, and because of its high specific heat requires more energy to raise its temperature per degree than any other concerned material. (2) The material the vessel is made of, particularly the vessel bottom which contacts the hot plate surface. Since the vessels usually are made of glass, glass-ceramics, or the like, with low thermal conductivities, the heat transfer through the bottom of the vessel is low. (3) The geometry of the vessel, particularly the vessel bottom surface area which contacts the hot plate, and the thickness of the bottom are important factors in heat flow. Glass vessels, for example, of necessity usually have thick convex bottoms which do not transfer heat efficiently.

Another important consideration for overall energy saving is the amount of energy required in the production of the vessels. For example five times more energy is required to produce the material for a glass vessel as it does for material of the same size plastic vessel. The material for an enameled steel vessel requires 42 times the energy for making a plastic vessel of the same size; an aluminum vessel, 48 times more energy than for the plastic vessel.

Still another consideration in energy conservation relates to the thermal conductivity of the sidewalls of a vessel. Unlike the bottom surface, thermal insulation is desirable in order to reduce loss of heat to the surrounding air. The polyfluorocarbons, polyolefins, and most other plastics are good insulators and glass is a fair insulator of heat.

From a materials of manufacture viewpoint, and from the viewpoint of the conductivity of the sidewalls it is clear that making and using vessels made partly or entirely of plastic would conserve a significant amount of energy. Plastic vessels are also economical to mass produce, are resistant to breakage, corrosion resistant and non-contaminating to many substances, depending on the polymer. A large variety of plastic vessels and containers made of polyethylene, polypropylene, the fluorocarbons and other polymers are widely available, having displaced glass and metal in many applications.

Unfortunately, plastic vessels cannot be heated by direct contact with a bottom surface heating means, such as hot plates, other heated platens, and the like. This is true even of plastics with relatively high softening or melting temperatures, such as the polyfluorocarbons, e.g. Teflon (a duPont trademark) with temperatures in the range of 400°–500° F. (204°–260° C.), well above the use temperatures for many applications. The reason for this, as previously indicated, is the very low thermal conductivities of these materials, which are heat insulators, and the relatively thick bottom wall of vessels made from these materials. The need for a vessel that can be heated on a hot plate with a minimum of expended energy is evident.

SUMMARY OF THE INVENTION

This invention provides a energy efficient heating vessel comprising a plastic walled body, and characterized by having a novel composite good heat conducting bottom. The vessels are suitable for laboratory, industrial, and service applications, particularly those requiring heating on hot plates and similar direct contact heating devices. The composite bottom of the vessels of the present invention comprises:

(1) a liquid-impervious innermost thin layer or film of a non-metal material, of a minimal thickness to minimize its resistance to heat transfer thru it, (2) an outermost layer of a rigid, good heat conducting material in thermally conductive contact with the inner film, bonded to and supporting the same, the outermost layer of composite bottom having a thermal conductance of at least 400 Btu/hr./sq.ft./°F., and a thermal conductivity at least 10 times higher than the sidewalls of the vessel, and having a high heating surface contact area, and (3) means for retaining layer (2) on the body of the vessel. The composite bottom has an overall thermal conductance of at least 50 Btu/hr.ft.sq./°F. In particularly preferred embodiments of the vessels of the present invention the body of the vessel and the impervious innermost layer are plastic and the outermost layer which directly contacts the hot-plate or heated platen when the vessel is in use, is a graphitic material.

It will be helpful to keep in mind the following distinctions among the terms used in this specification:

Thermal Conductivity is a "constant" or general property of a given material; Thermal Conductance is a particular quantity, equal to Conductivity divided by thickness.

Thermal Resistivity is a constant or general property, the reciprocal of Conductivity; Thermal Resistance is a particular, the reciprocal of Conductance.

BRIEF DESCRIPTION OF THE DRAWING

This invention is further illustrated by reference to the accompanying drawing in which.

The drawings, particularly of the inner films 4, 26, 33, 43, 53 and 63 are not in correct dimensional proportion. These films are intended to be thinner than shown.

DETAILS OF THE INVENTION

In preferred form, the body of the vessel is molded plastic with a graphitic or graphite base composite material bottom element insert including retaining or bonding means for the insert. In another preferred form, the energy saving vessel is fabricated from a tubular element with an open bottom end, to which is fitted a composite bottom secured by suitable means, preferably by a metal band, clamp, or other fastener. The bottom can also be retained by heat bonding, ultrasonic welding or molding the plastic side walls to the periphery of the composite bottom.

Figure 1:
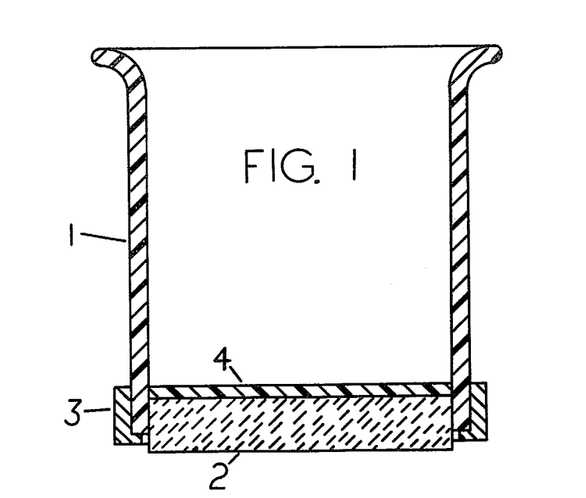
FIG. 1 is a cross sectional elevation view through a plastic walled vessel having plastic sidewalls 1 and a plastic 4 coated graphite bottom 2 assembled with a heat-shrunk metal fastener 3 to form the vessel. This is a currently preferred embodiment.

In FIG. 1, which is a cross section of a plastic walled cylindrical heating vessel with a composite bottom, 1 is the plastic vessel side wall, 2 indicates the graphite element of the composite bottom with a thin coating layer or film of plastic 4 over the internal surface of the graphite element, 3 indicates a metal band or ring which is heat-shrunk to the side walls and firmly secures the bottom, to the plastic vessel walls.

Figure 2:
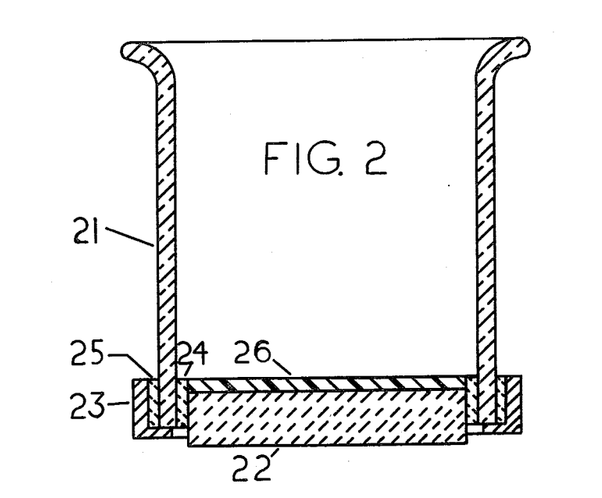
FIG. 2 is a cross sectional elevation view of a vessel having side walls 21 and a plastic 26 coated graphite bottom 22 assembled with gaskets 24, 25 and a metal fastener 23 to form the vessel.

A similar assembled vessel is shown in FIG. 2, which in this case is a cross section of a cylindrical heating vessel with a composite bottom, where 21 is the vessel side, 22 indicates a graphite element of the composite bottom, 26 indicates a plastic film over the internal surface (service side) of the graphite element, 24 and 25 are internal and external gaskets; respectively, such as flexible graphite ('Grafoil'), 23 indicates a metal band which is clamped to the sidewalls, and firmly secures the graphite bottom to the vessel walls and layer 26.

The energy saving vessels of this invention may be manufactured by the following procedure. The desired plastic, is molded as a one piece configuration or body with the composite bottom used as an insert to the bottom of the vessel during the molding process. The bottom plastic film may be the same plastic as the sidewalls, or of a different plastic. As in the previously described vessels, a mechanical fastener means, such as a metal clamp, band or other fastener may be used to firmly secure the bottom, although in some types of vessels it may not be required.

Figure 4:
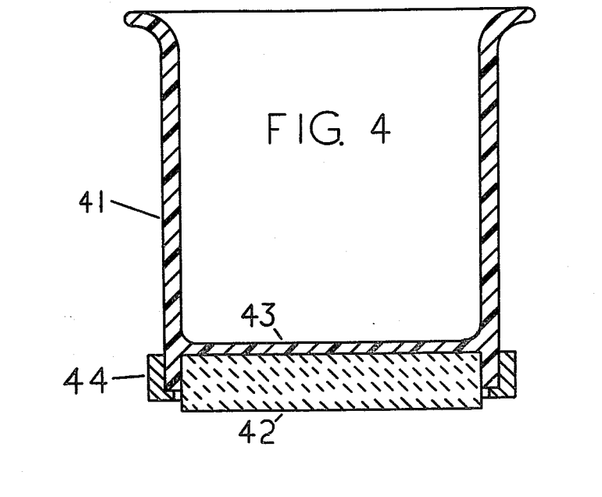
FIG. 4 is a cross sectional elevation view of a plastic bodied vessel having a molded plastic body 41 and a molded plastic inner layer 43, and a graphite element 42 assembled to the bottom of the vessel with a heat-shrunk metal fastener 44.

The vessel of FIG. 4 is a cross section of a molded plastic bodied heating vessel in accordance with this invention where 41 indicates the plastic sidewall continuous with the relatively thin molded plastic bottom layer 43 (or bottom area of the plastic vessel) over the internal surface of the inserted graphite element 42, which is molded to the plastic and enclosed by the plastic except for the external bottom surface, 44 is a metal band which preferably is heat-shrunk to the sidewalls and firmly secures the element 42 to the plastic sidewalls at the base.

Figure 6:
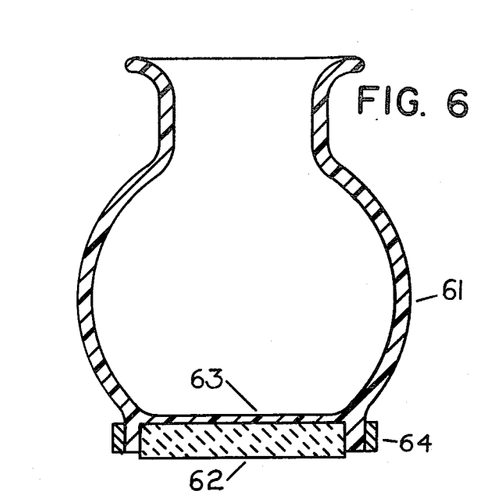
FIG. 6 is a cross sectional elevation view of a molded plastic bodied coffee flask 61 with a molded plastic inner film layer 63 and a graphite or metal element 62 assembled to the bottom of the flask with a fastener 64.

FIG. 6 is a cross section of a molded plastic bodied round vessel, (e.g., a coffee type flask), in accordance with this invention, where 61 indicates the plastic sidewall continuous with the relatively thin plastic vessel bottom 63, over the internal surface of the inserted bottom element 62, molded to the plastic body, 64 is a metal band which preferably is heat-shrunk to the sidewall and firmly secures the bottom to the plastic sidewalls at the base of the vessel.

Figure 3:
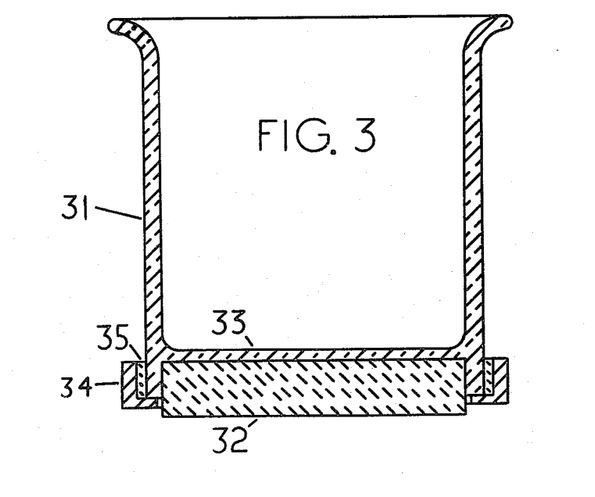
FIG. 3 is a cross sectional elevation view of a vessel having a molded body 31 with a molded inner layer 33 and a graphite element 32 assembled to the bottom of the vessel with at least one gasket 35 and a metal fastener 34.

In FIG. 3, which is a cross section of a molded bodied heating vessel, in accordance with this invention, 31 represents the sidewalls continuous with the relatively thin molded layer or bottom area 33, over the internal surface of the inserted graphite element 32, molded to the base of the vessel, 35 is an external gasket, such as flexible graphite, 34 indicates a metal band which preferably is clamped to the sidewall and firmly secures the graphite element to the sidewall at the base.

Figure 5:
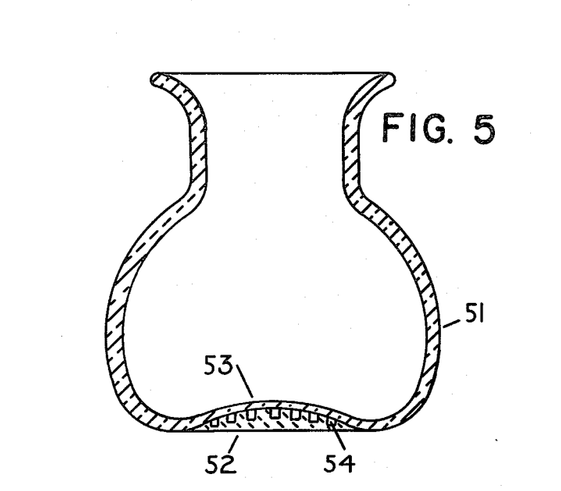
FIG. 5 is a cross sectional elevation view of a molded coffee flask 51 with a molded inner layer 53 with a graphite element 52 retained at the bottom of the flask by molded projections 54 in corresponding recesses in the graphite element.

In FIG. 5, which is a cross section of a molded spherical vessel (i.e. a coffee type flask) in accordance with this invention, 51 represents the sidewall continuous with the relatively thin molded vessel bottom 53, over the internal surface of the convex shaped inserted graphite disc element 52, molded to the vessel; small openings, or recesses 54, made in the graphite (size magnified in drawing) filled with sidewall material during the molding process further insure a bonding interlock or fastening of the sidewall to the graphite. A separate metal band or ring is not needed with this embodiment.

The preferred energy efficient plastic vessel may be manufactured from a large variety of commercial polymers and resins depending on the type of application. Thermosetting or thermoplastic polymers and resins can be used. However, the polyolefin, polysulfone, and fluorocarbon polymers are most suitable for the vast majority of applications and are preferred. Of these, the fluorocarbon polymers are the most inert with the highest melting or softening temperatures. Among these may be mentioned FEP (flourinated ethylene proplenes), PTFE (polytetrafluoroethylene), ETFE (ethylene/tetrafluoro ethylene copolymers), CTFE (polychlorotrifluoroethylenes) and PVDF (polyvinylidene flourides). Of these, polymers, FEP is readily fabricated in a variety of vessel shapes and sizes, has a high use temperature of 205° C. (401° F.), and is transparent. It is a near ideal material for use in the presence of strong acids, alkalies, oxidizing chemicals, and aggressive solvents.

For general use with a majority of chemicals and virtually all food stuffs, the polyolefins are satisfactory, being non-toxic, anti-contaminating materials that can be used at temperatures up to 175° C. (347° F.). Among the polyolefins, polypropylene, and polymethylpentene are preferred, although linear polyethylene and the newer ultra high molecular weight polyethylenes also may be used. Polypropylene is an excellent non-contaminating plastic with a use temperature up to 145° C. (275° F.), is tough, and is translucent. Polymethylpentene is also a good noncontaminating plastic with a use temperature up to 175° C. (347° F.), with excellent transparency.

Another preferred polymer, polycarbonate, is characterized by its outstanding strength, rigidity, and toughness, and excellent transparency. It is non-toxic material suitable for many chemicals and foodstuffs. It has a use temperature up to 135° C. (275° F.). The polysulfones are another group of preferred polymers for our novel vessels. Like the polycarbonates, they are transparent, of high strength, and anticontaminating for foodstuffs, biologicals and many chemicals. They may be used at temperatures up to about 200° C. (405° F.).

Polyphenylene sulfide polymers are high performance materials with excellent corrosion resistance and are anticontaminating, being particularly well suited for chemical processing applications. This is true of polyetherimide polymers, polyarylsulfone, polyethersulfone, which are also preferred. Polymers such as the nylons, polyesters, phenolics, and epoxies are also useful in a variety of applications.

In order to better understand how our energy vessels function and to show the significant differences compared to conventional glass and plastic vessels, reference is made to Table I which illustrates quantitatively thermal characteristics of our composite vessel bottoms vs bottoms of glass and plastic vessels, and other reference materials.

As is known, the heat flow rate through a material is directly proportional to its thermal conductivity and surface area of contact, and is inversely proportional to its thickness. Heat flow rate is also directly proportional to the temperature difference between the bottom and top surfaces of the heated bottom in a perpendicular direction; however, this is a variable heat factor in contradistinction to the basic physical characteristics of the material itself, that is, thermal conductivity, and geometry (i.e. thickness, flatness, contact areas). Therefore, by "heat flow capability" we mean the thermal conductance of the material times its surface area of contact, with conductance being the thermal conductivity of the material divided by its thickness. It can therefore be seen that a vessel bottom with a low thermal conductivity, a relatively thick cross section, and a small area of contact, is unfavorable to good heat transfer, all other factors being equal, as is illustrated in Table I hereof.

We have found that an energy efficient plastic bodied or walled heating vessel which can be used effectively at a relatively low temperature (300° F. + over) on a conventional hot plate, can be produced, by providing the vessel with the described composite bottom. The relatively thin film liquid-impervious innermost layer, e.g. plastic bottom area, is mechanically supported by physically contacting, bonding, or molding it to a rigid material having high thermal conductivity, preferably a graphitic material. Heat transfer is further improved by providing a bottom outer surface that is relatively flat or otherwise contoured to make maximum thermal contact with a hot plate surface. The internal surface of the novel vessel can therefore be all plastic.

As mentioned above, the innermost layer of the composite bottom is preferably plastic. Other impervious materials can also be used. Useful materials include glasses and ceramics. These coatings like the plastic coatings can be made quite thin, not over about 0.030 in., so as to not seriously impede heat flow since they are supported and protected by the outermost rigid heat conducting layer.

Another important advantage of the structure of the vessels described herein is that the impervious layer is in good thermal contact with the inner surface of the heat conducting outermost layer, since it is molded, coated, or otherwise bonded contiguous to the surface of these good heat conducting materials. (The word 'impervious' is used here in the general sense of being leakproof, since virtually all polymeric plastic materials absorb to a greater or lesser amount, certain liquids and are permeable to a degree depending on temperature, pressure, thermal cycling and other conditions of applications.) This means that virtually its entire surface makes excellent contact with the heat source via the outermost layer. It is also relatively easy to machine a flat or contoured bottom surface on the materials useful for the outermost layer, allowing good contact to be made with a hot plate surface. However, the need for this flatness is not as stringent as it would be for a material such as a plastic or glass with poor thermal conductivity, and therefore poor heat distribution, further accentuated by the uneven or concave bottoms characteristic of such vessels produced by molding, where the contacting bottom is only of ring area, or only a small part of its bottom area. Thus it can be seen by using a thin liquid-impervious inner film to minimize its resistance to heat transfer, bonded to a rigid outer element having high thermal conductivity so as to further minimize resistance to heat transfer thru the combined materials of the composite, why a uniform high heating rate and efficiency is obtained with the energy saving vessels hereof, in contrast to the relatively non-uniform, hot-spot heating of conventional glass vessels, and why it is not feasible to use conventional plastic vessels, with their relatively thick bottom wall and concave bottom, on a hot plate.

Referring to Table I, the table shows a comparison of thermal characteristics of bottoms of energy saving vessels hereof vs. bottoms of conventional glass and plastic vessels. The table is a tabulation of the following 8 parameters for each of the "Bottoms" arbitrarily designated A, B, . . . etc. in the first column:

material
thickness (L) in inches
Thermal Conductivity (K) - BTU/hr/sq ft/°F./in
Thermal Conductance (U) - BTU/hr/sq ft/°F. (which is equal to K/L)
Heating Surface Contact Area (A) - sq ft
Heat Flow Rate Capability (UxA) - BTU/hr/°F.
Ratio of Heat Flow Rate Capability of each Bottom to that of Bottom A
Ratio of Heat Flow Rate Capability of each Bottom to that of Bottom C.

TABLE I

THERMAL CHARACTERISTICS OF BOTTOMS OF ENERGY SAVING VESSELS VS. BOTTOMS OF GLASS AND PLASTIC VESSELS AND OTHER REFERENCE MATERIALS

| Bottom | Material | Total Thickness l (in.) | Thermal Conductivity K | Thermal Conductance U |
|---|---|---|---|---|
| A | Glass | .0625 | 8 | 128 |
| B | Impervious Graphite | .250 | 975 | 3900 |
| C | Poly. Prop. Plastic | .060 | 1.3 | 22 |
| D | Poly. Prop./ Graphite | .003 .250 | 1.3 975 | 390 (comb.) |
| E | Teflon FEP/ Graphite | .010 .250 | 1.44 975 | 139 (comb.) |
| F | FEP/ Graphite | .003 .250 | 1.44 975 | 427 (comb.) |
| G | Glass/ Graphite | .025 .1875 | 8 975 | 301 (comb.) |
| H | FEP/ Aluminum | .003 .250 | 1.44 1070 | 432 (comb.) |
| I | Porc. enamel/ C. Steel | .016 .125 | 8 360 | 426 (comb.) |
| J | FEP Plastic Porc. enamel/ C. Steel | .002 .016 .125 | 1.44 8 360 | 268 (comb.) |
| K | S. Steel (304) | .200 | 105 | 525 |
| L | Teflon FEP | .010 | 1.44 | 144 |
| M | Polymethylpentene/ graphite | .003 .250 | 1.40 975 | 417 (comb.) |
| N | PMP Graphite | .021 .250 | 1.4 975 | 66 (comb.) |
| O | PSF Graphite | .017 .250 | 1.8 975 | 104 (comb.) |
| P | PCTFE Graphite | .025 .025 | 1.74 975 | 68 (comb.) |

| Bottom | Heating Surface Contact Area A (sq. ft.) | Heat Flow Rate Capability (BTU/hr/°F.) | Bottom Heat Flow Rate Capability Ratio Bot/A | Bot/C |
|---|---|---|---|---|
| A | .010 | 1.28 | | 5.8 |
| B | .088 | 343 | 268 | 1559 |
| C | .010 | .22 | .017 | — |
| D | .088 | 34 | 26.6 | 155 |
| E | .088 | 12.2 | 9.5 | 55 |
| F | .088 | 37.6 | 29.3 | 171 |
| G | .088 | 26.5 | 21 | 120 |
| H | .088 | 38 | 29.7 | 173 |
| I | .088 | 37.5 | 29.3 | 170 |
| J | .088 | 23.6 | 18.4 | 107 |
| K | .088 | 46.2 | 36.1 | 210 |
| L | .088 | 12.7 | 9.9 | 58 |
| M | .088 | 37 | 29 | 168 |
| N | .088 | 5.8 | 4.5 | 26.4 |
| O | .088 | 9.2 | 7.2 | 42 |
| P | .088 | 6.0 | 4.7 | 27 |

Footnotes to Table I:
The amount of heat transferred by conduction (Fourier's Law) $Q = KA\Delta T/l$ where Q = heat transferred per unit time, or heat flow rate, (B.T.U./Hr), A = area perpendicular to heat flow (Sq. Ft.), l = thickness (in.) K = thermal conductivity of material (B.T.U./Hr/Sq. Ft./°F./in.), $\Delta T$ = temperature diff. between sides of bottom material through which heat flows. Law of conductivity may also be stated, $Q = UA\Delta T$ where U is conductance (k/l) in BTU/hr./sq. ft./°F., combined conductances in layers, as plastic over graphite
$$\frac{1}{U} = \frac{1}{U_1} + \frac{1}{U_2} + \frac{1}{U_3}$$ — $U_1$ is plastic, $U_2$ graphite, etc.

Contact area refers to 4 in. dia. bottoms in sq. ft. All vessel bottoms have the same diameter and vessels the same volume capacity. Heat flow rate 'capability' (UA) is used here to indicate the material factors such as thermal conductivity (k) and geometry (surface area of contact (A) and thickness (l) of a bottom material, that determine heat flow rate capability and not including process variables such as hot plate temperature, assuming all such conditions are equivalent in comparing bottom materials.

Referring to the discussion above and to Table I relating to a conventional plastic beaker, in this example the conventional plastic vessel is a 4 in. diameter beaker with a polypropylene bottom C about 0.060 in. thick. The invention beaker is a similar polypropylene 4 in. dia. beaker except the composite bottom D consists of a 0.003 in. thick polypropylene film bonded to a 0.250 in. thick graphite supporting bottom piece. The thermal conductivity, K, is the same, 1.30, btu/hr./sq.ft./°F./in., for both plastic bottoms, C and D, but the thermal conductance, U, is only 22 for the 0.06 in. thick plastic bottom of the beaker, C vs. 390 for the composite graphite/plastic bottom D, or about 18 times greater. Since the bottom contact area of the conventional beaker is only about 1/10th that of the composite plastic/graphite bottom (since it is concave), the heat flow rate capability, UA, of the composite plastic graphite bottom, D, is 34, and 34/0.22 = 155 times greater, where 0.22 is heat flow rate capability of bottom of plastic beaker. This illustrates the unique thermal characteristics of the energy saving vessel.

It can also be seen in Table I that a FEP (0.003 in. thick) plastic, and an aluminum 0.250 in. thick bottom H, of total thickness of 0.253 in. has about the same high heat flow rate capability ratio, 38/0.22 = 173, as bottom D. Again referring to Table I, a carbon steel bottom piece coated with 0.008 in. of a porcelain-enamel on each surface, plus a 0.002 FEP plastic film bonded to its top surface, (J), has a combined thermal conductance, U, of 268, or 12.2 times greater than the plastic bottom 0.060 in. thick, and a heat flow rate capability 107 times higher.

In plastic vessels of the type shown in FIG. 1, where the composite bottom element 2, 4 is inserted, and secured to the open ended base of the vessel, the thin impervious layer 4 can be a plastic film molded to the graphite 2, or a coating, sprayed, dipped, painted, or otherwise applied. The plastic preferably is selected from polyolefin, polyflourocarbon, polycarbonate, polysulfones, polyphenylene sulfides, or other suitable corrosion-resistant, anti-contaminating polymer, or resin, including fiber reinforced graphite, or glass filament wound structures, or filled plastics. The bottom plastic may be the same material as that used for the vessel body, or another type, such as a glass filled polymer, for greater abrasion resistance. The impervious layer 4 preferably is thin i.e. up to 25 mils (to 0.025 in.) thick, although a somewhat thicker layer can be used for certain applications particularly with glass or porcelain impervious layers (about 0.030 in.). A resin infiltrated graphite, element 2 coated with the same resin 4 can also be used. A graphite, element 2 infiltrated with a FEP fluorocarbon resin and coated on the top surface with about 3 mils of the same resin 4 is described in Example 1. A graphite based material may also be used as a composite bottom. By a graphite based material we mean one containing over 50 vol % graphite as the major constituent, with a balance of metals such as copper and aluminum, glass, carbon, ceramics, resins, or combinations of these. The graphites can also be infiltrated with boron or phosphorus compounds. Such materials are generally made by powder metallurgical techniques with powdered materials and or fibers or by impregnation techniques. These materials are laminated or coated on their service (inner) side with plastic films or resins.

In preferred embodiments the outermost layer of the composite bottom is a graphitic material, the selection of a graphitic material is based not only on its good thermal conductivity, but on its excellent corrosion resistance, anti-contaminating, non-toxic nature, also its good fabricability, machinability, lightweight, excellent heat shock resistance, relatively low cost and availability. It is also virtually warp proof, when placed on heated surfaces.

Graphite is also characterized by an advantageous porous structure. This facilitates the bonding, coating or laminating of the impervious layer to its surface. This porous structure also facilitates bonding the composite bottom to the remainder of the vessel. For example a plastic vessel having a graphite bottom was prepared. A metal ring was heat-shrunk around the periphery of the bottom as previously described. It was found that the metal ring could be removed yet the graphite bottom remained firmly retained on the body of the vessel. While not wanting to be bound by any theory, it is believed that the softened plastic in the vicinity of the hot metal ring permeated the porous graphite and upon cooling formed a firm bond with the porous graphite bottom on its peripheral edge.

Since graphite, as manufactured, is ordinarily too porous to be used under pressure, except for specialized types, such as pyrolytic graphite, or filament wound structures, it is usually impregnated with a resin, generally a phenolic, epoxy, furan, or a fluorocarbon resin. The most common type of impervious graphite, "Karbate" (Union Carbide trademark) is 85 to 90% by weight graphite with the balance generally being a phenolic resin. For most of the applications involving the vessels of this invention, little or no pressure above atmospheric is used; therefore, graphites, or graphite/-carbon materials with some porosity may be used, particularly if a plastic layer is bonded to the inner service surface as described above. It may be desirable to coat the outer surface, about half way up the peripheral edge of the graphitic element or layer with an epoxy, phenolic, silicone or like resin to a thickness not over about 2 mils to prevent water etc. from being absorbed particularly if the vessel is suddenly cooled in water externally from a high temperature. However, it does not effect the vessels function and may be omitted. Carbon can be added to graphite to improve its hardness or abrasion resistance; however, it significantly lowers the good thermal conductivity of graphite. There are various grades of graphite with varying strength, hardness, abrasion resistance, bulk density, porosity, permeability, thermal conductivity, thermal expansion, etc. Where a thin layer of plastic is to be bonded to the surface, a grade of graphite with a relatively fine to medium grain structure and a bulk density of about 1.5 g/cc or over is desirable.

The thickness of the graphite bottom will depend largely on the vessel geometry, particularly the diameter. For example, graphite, about ⅛ to ⅜ in. thick is satisfactory for vessels up to about 4 to 5 in. diameter, as the bottom contact area, whereas vessels about 6 to 12 inch diameter would require a thickness of about ⅜ to ¾ in. Such vessels may also require metal supports attached to the bottom metal band.

In addition to the preferred graphite materials just described metals can also be used in the composite bottom in some instances. Metal elements of composite metal bottoms for plastic bodied or walled heating vessels may be considerably thinner than graphite elements with a thickness range of about 1/16 to ¼ inch for vessel bottoms up to about 12 in. in diameter. Aluminum, stainless steels, copper, nickel, iron, titanium, and their alloys, and tantalum, can be used as vessel bottom elements, like the graphitic materials metals may be coated with a plastic, glass and the like, or have a thin plastic layer molded to its top surface. Metals may also be used as inserts in the molding of plastic bodied vessels as previously mentioned, FIGS. 4, 6. Comparing plastic coated graphitic and metallic materials, it is evident that in the event of damage to the plastic layer, a graphitic bottom would not be attacked, or be contaminating to the media, whereas a metal bottom would be much more vulnerable.

A wide variety of coating glasses or enamels and glass-ceramics are available for the impervious layer of the composite bottom, depending on the application. These materials are well known, as are the methods of processing. For general, broad applications, where excellent corrosion resistance, anti-contamination, and relatively good thermal shock is required, a coating with properties and characteristics similar to those of a borosilicate glass is generally used.

A metal band, clamp, or similar fastening device is generally desirable to retain the composite bottom at the base of the vessel. A metal band around a molded-in bottom places both the plastic sidewall and graphite bottom piece in compression, relieving the tensile stresses. The metal band not only secures the bottom plate firmly to the wall and inner layer in sealed abutment, but its lower edge also protects the plastic vessel wall from direct contact with the hot plate, and protects much of the graphite bottom periphery.

The metal ring, or band, may be made of a variety of materials, including the carbon steels, stainless steels and other stainless alloys, aluminum, and others. Metals like the carbon steels may be electroplated or resin coated. The band may be made of solid metal, metal mesh, wire design, and the like. A large variety of metal clamps and fasteners may be used. We found that a solid metal ring firmly secured by shrink fitting is useful. A small shoulder or ledge at the bottom side of the ring may be used since it helps secure the plastic edge and protect it but should not touch the graphite bottom. Such a ledge is shown in the drawing as parts 5, 27, 36 and 45 of rings 3, 23, 34 and 44 of FIGS. 1-4, respectively. The ring or band can also be non-metallic such as a glass or graphite filament wound resin structure or glass or graphite resin impregnated fabric.

In fitting the metal ring or band, care must be taken to allow for differences in thermal expansion of the wall and bottom materials over the entire temperature range of the application. For example, if we consider an open ended polypropylene, walled vessel like that of FIG. 1, with an inside diameter of 2.85 in. and an outer diameter of 2.970 in., and a graphite bottom disc of 2.85 in. o.d. which would snug-fit in the i.d. of the plastic vessel, then a type 420 stainless steel ring would require an i.d. approx. 0.005 in. less than the o.d. (2.970 in.) of the plastic vessel at room temperature. The ring will expand 0.005 in. if it reached a temperature of 350° F. Inasmuch as the ring must keep the plastic and graphite in strong compression, it has to be undersize at room temperature, and heated to above 350° F. to expand it, in order to shrink fit it on the vessel. The thermal expansion coefficient of graphite is about ⅛ that of stainless steel. In use therefore, the graphite would expand enough to 'sandwich' the expanding plastic against the graphite and the stainless ring with a compressive force great enough to keep the bottom intact and leak proof. In fitting, or molding the bottom element to the plastic sidewalls at the base of the vessel it is desirable to reduce the thickness of the sidewall in this area since it facilitates sealing and also helps in the dissipation of heat from this area.

In one preferred embodiment, the heating surface contacting area of the bottom is smaller than the area of the service side of the bottom. This is done by forming a recessed step around the periphery of the surface of the bottom intended for contact with the heating means. Vessels whose bottom has such a recessed step can be used in contact with heating means of higher temperature than similar vessels without a recessed step with less risk of heat damage to the sidewall material. This is illustrated in example 12.

The following examples are presented to illustrate the invention.

Example 1—Polypropylene/FEP-coated graphite vessel

A 250 ml polypropylene beaker was placed in a lathe and the bottom machined out, leaving an open ended cylinder. The bottom end was fitted with a graphite disc machined from a porous graphite rod having a bulk density of about 1.72 g/cc. The disc was machined to a thickness of 0.25 in. and a diameter to conform to the i.d. of the plastic cylinder, in this case 2.85 in. The vessel wall was 0.06 in. thick and 2.970 in. o.d. The graphite was infiltrated with a fluorocarbon resin, in this example, an FEP suspension. The disc was infiltrated by placing it in a gasketed metal funnel with a side arm outlet. This was connected with vacuum tubing to a mechanical vacuum pump, and evacuated from the underside of the disc. The FEP suspension (a DuPont preparation) was fed in from the top until the pores were filled and the suction ceased. The excess resin on the sides was removed, and the disc air dried and cured at 550° F. in an electric oven. A coating of the FEP resin was then sprayed over the top side of the infiltrated disc, air dried, and cured at 750° F. for 1 hour. The impregnated disc with a 2 mil coating was then pressed into the bottom side of the plastic cylinder, with the coated surface facing into the vessel, substantially as shown in FIG. 1, forming a snug fit but not forced. The graphite disc was then firmly secured and sealed by means of a stainless steel band applied by shrink fitting. The band or ring was machined from stainless steel type 420, to an i.d. of 2.965 in. which was 0.005 in. less than the i.d. of the plastic cylinder (2.970 in.). This represented the expansion of the band to a temperature up to 350° F., well in excess of the temperature it, and the plastic would reach, even at hot plate temperatures of 475°–500° F. The metal band was ⅜ in. wide and was made with a small shoulder or ledge (5, FIG. 1) to protect the plastic, and most of the graphite periphery, as shown in FIG. 1. In applying the ring to the plastic cylinder with the impregnated graphite disc, the ring was heated in excess of 350° F. to allow a fast, easy fit over the o.d. of the cylinder. After the ring was applied, it was immediately cooled in water. The ring was so firmly secured that it, or the graphite bottom, could not be pushed from the plastic cylinder by hand force.

Figure 7:
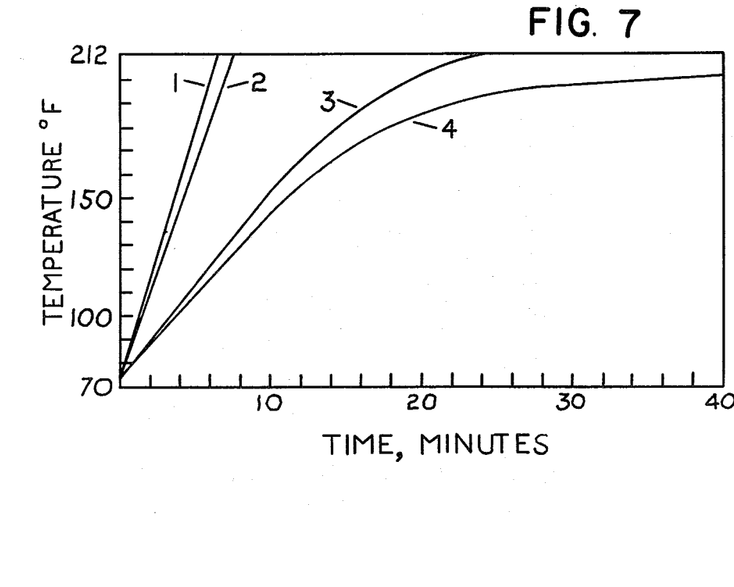
FIGS. 7–12 are charts of time-temperature data obtained while heating water in energy saving vessels of the invention compared to heating water in conventional glass vessels.

The beaker described above was filled with 200 ml of water at 73° F. and covered with a watch glass. A conventional griffin style 250 ml borosilicate beaker was also filled with 200 ml of water (73° F.) and covered with a watch glass. Both beakers were placed at ambient room temperature of about 70° F. on a rectangular 750 watt flat hot plate which was at a temperature of 400° F. as indicated by a surface thermometer. Both beakers were of approximately the same diameter. Temperature reading of the water in the beakers were made at 1 minute intervals. The beakers were heated to the boiling temperature or until a temperature time equilibrium was established. This procedure was repeated 3 times with 3 similarly prepared sets of beakers. The average of the data obtained were plotted to obtain temperature-time curves 1 and 3 shown in FIG. 7, where curve 1 represents data for the fluorinated ethylene propylene beaker of the invention and curve 3 represents data obtained for the glass beaker. These curves show the significant difference in heating rates of the plastic/graphite vs. glass vessels. Beaker 1 reached the boiling point in 6.5 minutes compared to 24 minutes for beaker 3; the time ratio to reach boiling was 24/6.5 or a heating rate 3.7 times higher for 1 than 3. This also means that the glass beaker consumed 3.7 times more heat energy than the plastic/graphite beaker 1.

The above procedure was again repeated with the same beakers uncovered. The results obtained are shown also in FIG. 7, where curves 2 and 4 are time-temperature curves for the plastic/graphite and glass beakers, respectively. It can be seen that the water in the polypropylene/graphite beaker 2, reached the boiling point in 7 minutes, and the water in the glass beaker did not reach the boiling point even after 40 minutes. Actually the water in the glass beaker reached a maximum temperature of only 204° F. after 1½ hours. If we select a comparison of time to attain a temperature of 200° F. for the two vessels, it can be seen that 6.2 times more energy was required to heat the water in the glass beaker to 200° F., than the plastic/graphite beaker of the invention.

Example 2—Polymethylpentene/graphite Vessel

A commercial polymethylpentene beaker of 250 ml capacity was placed in a lathe and the bottom machined out. The bottom end of the resulting cylinder was fitted with a graphite disc machined from porous graphite rod of a bulk density of 1.76 g/cc. The disc was 0.25 in. thick and of a diameter to conform to the i.d. of the beaker, in this case 2.67 in. The vessel wall was 0.05 in. thick and 2.77 in. o.d. Although the graphite material had a porosity of about 10 vol. percent, it was not infiltrated, since testing showed that it did not appreciably absorb water unless it was under pressure. One side of the graphite disc, that would serve as the internal bottom side of the vessel, was coated with a 2 mil thick film of polychlorotrifluoroethylene by molding. This was accomplished in a mechanical lever press at a pressure of about 1000 psig and a temperature of about 500°–550° F. causing the film to be strongly bonded to the graphite. The coated disc was then hand pressed into the bottom end of the cylinder forming a snug fit, but not forced, to form a plastic walled vessel substantially as shown in FIG. 1. The graphite disc was firmly secured by means of a carbon steel ring or band applied by shrink fitting. The band was machined to an i.d. of 2.763 in., which was 0.007 in. less than the o.d. of the plastic cylinder (2.770 in. at room temperature). This difference in inner and outer diameters (0.007 in.) represents the expansion of the band to a temperature up to about 422° F., well within the temperature the band and the plastic would reach, even at hot plate temperatures of 500° to 550° F. The metal band was ⅜ in. wide and was made with a small shoulder or ledge (element 3 of FIG. 1) to protect the plastic, and most of the graphite discs periphery. The ring was applied as described in Example 1, except that the temperature to which the ring was heated was in excess of 422° F.

Figure 8:
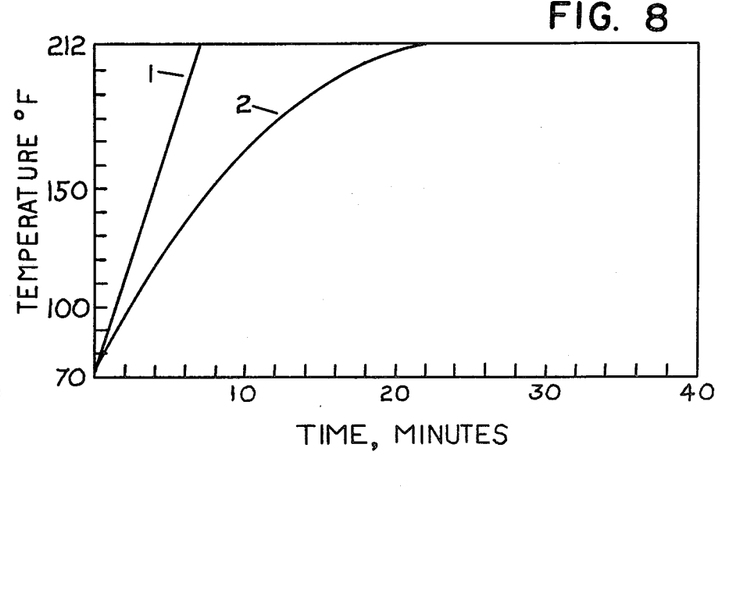

Three polymethyl pentene/graphite and three new glass beakers were evaluated in accordance with the time-temperature heating tests procedure described in example 1. The results obtained are shown by the temperature-time curves in FIG. 8. In FIG. 8 curve 1 represents data for polymethyl-pentene/graphite, and curve 2 represents data for glass. Each beaker contained 200 ml of water, and was covered. The hot plate temperature was 475°-500° F. The water in the polymethylpentene/graphite beaker reached boiling in 7 minutes compared to 22 minutes for the glass beaker. The ratio of 3.1 indicates that 3.1 times more heat energy was required to heat the water in the glass vessel 2, to boiling, as compared to the polymethyl pentene/graphite beaker of the invention.

Example 3—Polypropylene coated imperious Graphite vessel

A commercial polypropylene beaker of 250 ml capacity, was placed in a lathe and the bottom machined out. The bottom end of the plastic beaker was fitted with an impervious graphite disc ('Karbate', a Union Carbide Corp. product), cut and machined from a rectangular piece of the material. The disc was 0.25 in. thick and of a diameter to conform to the i.d. of the polypropylene beaker, in this case 2.85 in. (as in example 1). The plastic wall was 0.06 in. thick and 2.970 in. o.d. A polypropylene (PP) film 0.005 in. was molded to the service side of the disc as described in example 2, except that the molding temperature was about 400° F. The coated disc was secured to the vessel with a shrink fit aluminum band about 1/16 in. thick and ⅜ in. wide, with a narrow shoulder on the bottom side substantially as described in examples 1, and 2, and shown in FIG. 1. Since the ring was aluminum, allowance had to be made for the higher expansion. The ring was applied in accordance with the method described in example 1. The novel beaker was capable of applications as a vessel in the same temperature range as the polypropylene beaker in example 1.

Figure 9:
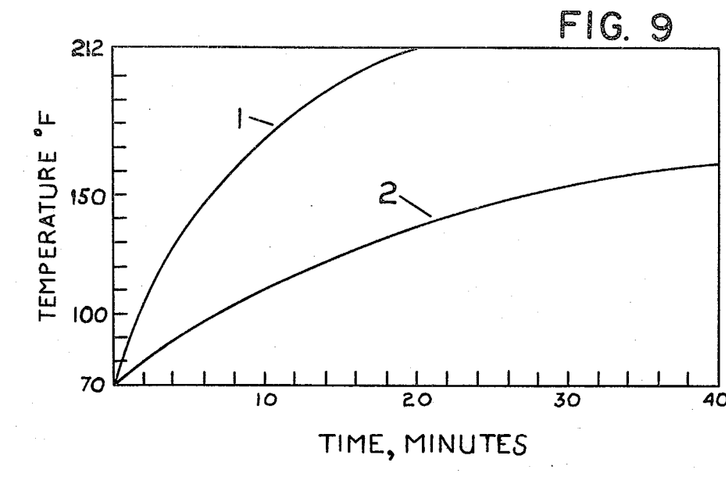

Three such polypropylene/graphite, and three glass beakers were evaluated in accordance with the procedure used in examples 1 and 2, and the results are shown in FIG. 9, wherein curve 1 is for polypropylene/PP coated graphite, and curve 2 is for glass. The beakers contained 200 ml of water and were covered. The hot plate temperature was 240°-260° F. The water in beakers of the invention reached the boiling point in 20 minutes whereas the water in the glass beakers reached a temperature of only 160° F. in 38 minutes. With continued heating, the water in the glass beakers reached an equilibrium temperature of 178°-180° F. after 2 hours of heating as will be described in the next example 4. This temperature was not exceeded after 2 weeks (336 hours) of continuous heating at 240°-260° F. FIG. 9 shows that the water in the polypropylene/PP coated graphite beaker (1) reached the temperature of 160° F. in 7.8 min. as compared to 38 minutes for water in the glass beaker (2), or a ratio of 4.9. Thus heating water in the glass beaker required 4.9 times as much energy as that required in the plastic/graphite beaker (1). The relatively low hot plate temperature of 250° F. used to boil water in the plastic/PLP coated graphite beaker represents a difference of only 38° F. (21° C.) between the hot plate and the boiling water. Hot plates operating at this temperature would be highly energy saving for many applications.

Example 4—Reflux heating of water in Polypropylene/PP-coated Graphite Vessel The open ends of the novel beakers made as described in example 3 were fitted with gaskets and covers and connected to refluxing condensers. With 200 ml of water in two of the polypropylene/PP coated graphite beakers, and the same in two glass beakers, all the beakers were heated on a hot plate at 240°-260° F. After 18 to 20 minutes of heating, the water was boiling in the beakers of the invention. The water in the glass beakers at this time was only at a temperature of 160° F. (see FIG. 9). Heating was continuous for 2 weeks (336 hours) with the water in the glass beakers reaching a maximum temperature of 178°-180° F. This equilibrium temperature was reached in about 2 hours and remained so during the entire period. The temperature of the aluminum bands on the novel beakers stabilized at 230°-236° F.

Examination of the novel polypropylene/PP-coated graphite beakers after testing showed them to be in excellent condition.

Example 5—Borosilicate glass/PP-coated Graphite Vessel

Figure 10:
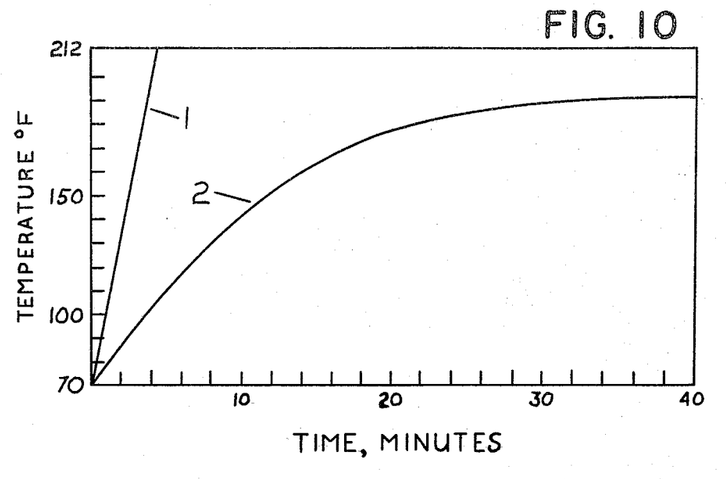

A Borosilicate glass/PP-coated graphite vessel substantially like that shown in FIG. 2 of the drawing was prepared and tested as follows. A borosilicate glass beaker of 250 ml capacity was carefully fixtured and mounted on a diamond cut-off wheel machine and the bottom cut off. The cut surface was then carefully ground to a smooth finish and fitted with a graphite disc gasketed with flexible graphite ('Grafoil' Union Carbide Product). It was snugly fit with finger pressure, with the gasket (24, FIG. 2) compensating for the dimensional variations in the i.d. of the glass. The graphite, of bulk density 1.76 g/cc, had an expansion coefficient the same as the glass ($1.8 \times 10^{-6}$ in./in. °F.) The graphite (22, FIG. 2) was secured to the glass cylinder with a stainless steel type 420 band 23 of the type described in Example 1. A flexible graphite, external gasket 25 between the glass and metal ring compensated for the dimensional variations of the glass cylinder o.d. The ring was fitted as described in Example 1, allowing for expansion to 350° F. The graphite disc 22 with a bulk density of 1.76, the same type used in example 2, was coated with a 0.005 in. thick film of polypropylene. Three glass/PP-coated graphite beakers and three all-glass beakers were filled with 150 ml water, covered and evaluated as in the previous examples. In this example, the hot plate temperature was 290°-310° F. The curves in FIG. 10 shows that the glass/PP-coated graphite beakers, curve 1, reached the boiling point in 5 minutes compared to the glass beakers, curve 2, which reached a maximum temperature of 190° F. one obtains a ratio of 8.1. Thus it requires over 8 times the energy to heat the water in the all-glass beakers to 190° F. as it did the glass/PP-coated graphite beakers.

Example 6

Figure 11:
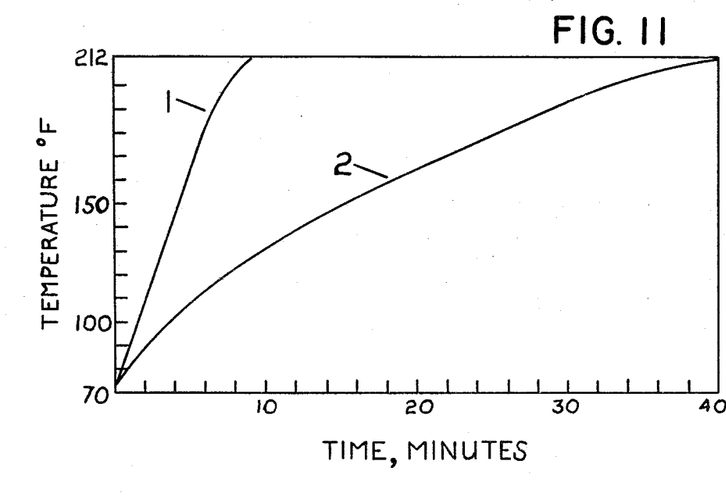

A polypropylene beaker, fitted with an impervious graphite ('Karbate') disc, secured with a type 304 stainless steel ring of expansion 0.0074 to 350° F. (177° C.) was prepared and evaluated in accordance with the previous examples. The results as shown in FIG. 11. For the covered beakers heated at 340° F. (171° C.) on a hot plate, it can be seen that the glass beaker requires 4.4 times the energy of the plastic/graphite beaker of the invention to heat water to the boiling point.

Example 7

Figure 12:
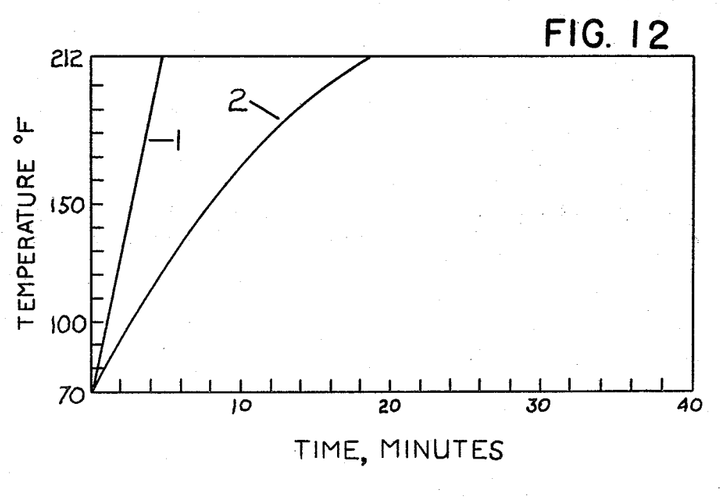

A polymethylpentene ("pentene") beaker, fitted with a graphite disc of bulk density 1.76 g/cc, to which was molded a 2 mil thick PCTFE film, and secured with type 420 stainless steel ring, was prepared and evaluated in accordance with the previous examples. The results are shown in FIG. 12, for covered beakers heated on a hot plate at 480°–500° F. (240°–260° C.). It can be seen that the water in the glass beaker requires over 4 times more energy to reach the boiling point, than the water in the plastic/coated graphite beaker.

Example 8

Two vessels of approximately 2500 ml caplacity each were tested: (1) a polypentene plastic vessel fitted with a graphite bottom element and (2) a conventional glass vessel. These vessels were evaluated in a similar manner to the vessels in the previous example by heating on a hot plate at a temperature of 480°–500° F. (249°–260° C.). Both vessels were covered. The graphite disc, and metal band, and the method of preparation of (1) were the same as that described in example 7, except for the diameter which was approximately 4 in. The results showed that the glass vessel required 4.6 times the energy to reach the boiling point then the water in the pentene/graphite vessel (also 2000 ml) required only 14.6 minutes to reach boiling.

Example 9

A polypropylene beaker fitted with an aluminum alloy (6061) disc 0.125 in. thick, to which was molded a 0.003 in. thick PCTFE film was prepared in accordance with example 7. The evaluation was also in accordance with previous examples. Thus the polypropylene/coated aluminum, and glass beakers each were filled with 200 ml of water at 72° F. (22.2° C.) covered and placed on a hot plate at 375°–400° F. Thus the plastic-aluminum beaker used only about ¼ of the energy required by the glass beaker.

Example 10

Part A

A 250 ml polypropylene beaker with a FEP-coated graphite bottom, element of the same type described in example 1, was filled with 200 ml of water at 70° F., covered with a watch glass, and placed on a hot plate at a surface temperature of 600° F. (316° C.). The water in the beaker came to a vigorous but smooth boil in 3 minutes. This is shown in Table I which gives hot plate temperatures, water temperatures, and time. No warping of the graphite bottom occurs, even after repeated heating and cooling cycles.

TABLE II

| | Hot Plate Temperature Vs Time to Boil Water in Polypropylene/FEP-Coated Graphite Beaker | | | |
|---|---|---|---|---|
| | Hot Plate Temperature | | Water Temperature | |
| Time Min. | °F. | °C. | °F. | °C. |
| 0 | 600 | 316 | 70 | 21 |
| 1 | 580 | 304 | 118 | 48 |
| 2 | 565 | 296 | 170 | 77 |
| 3 | 550 | 288 | 212 | 100 |

TABLE II-continued

| | Hot Plate Temperature Vs Time to Boil Water in Polypropylene/FEP-Coated Graphite Beaker | | | |
|---|---|---|---|---|
| | Hot Plate Temperature | | Water Temperature | |
| Time Min. | °F. | °C. | °F. | °C. |
| | | | (vigorous boil) | |

Although the hot plate temperatures shown in Table I are well in excess of the recommended 400° F. (204° C.) temperature for polypropylene/graphite or polypropylene/aluminum beakers, it illustrates the broad hot plate temperature range in which these vessels can operate.

Part B

Table II shows the time, hot plate temperatures and water temperatures of an all glass 250 ml beaker, filled with 200 ml of water, covered with a watch glass, and placed on the same hot plate as used in Part A at a surface temperature of 600° F. (316° C.).

TABLE III

| | Hot Plate Temperature Vs Time to Boil Water in Glass Beaker | | | |
|---|---|---|---|---|
| | Hot Plate Temperature | | Water Temperature | |
| Time Min. | °F. | °C. | °F. | °C. |
| 0 | 605 | 319 | 70 | 21.1 |
| 1 | 600 | 316 | 84 | 28.9 |
| 2 | 593 | 313 | 100 | 38 |
| 3 | 598 | 315 | 116 | .41 |
| 4 | 608 | 319 | 130 | 54 |
| 5 | 608 | 319 | 143 | 62 |
| 7 | 570 | 299 | 167 | 75 |
| 8 | 550 | 288 | 178 | 78 |
| 9 | 540 | 282 | 187 | 86 |
| 10 | 545 | 286 | 196 | 92 |
| 11 | 560 | 293 | 205 | 96 |
| 11.75 | 574 | 301 | 211 | 99.9 |
| | | | (weak boil) | |

From the data in Tables I and II, it is seen that, as in previous examples, a large energy savings is evident, since it requires about four times longer to boil water in a glass beaker compared to the plastic/coated graphite vessel of the invention. Only ¼ the energy is required to boil water in the polypropylene/coated graphite beaker, compared to the all-glass beaker. Bumping was quite in evidence in the glass beaker, as compared to the very smooth boil of the energy saving beaker of the invention.

Example 11

A 250 ml polypropylene beaker with an open ended bottom was fitted with a procelain-enameled steel bottom to prepare a polypropylene/porcelain-enameled steel vessel in accordance with the technique used in previous examples. The low carbon steel disc, 0.125 in. thick, was coated by a commercial shop with a 0.008 in. thick porcelain-enamel coating on each side of the disc, or a total thickness of 0.016 in.

This beaker was evaluated as described in Example 10 along with a similar glass beaker, at a hot plate temperature of 375°–400° F. (190°–204° C.) The results were much like the previous examples with the plastic/porcelain-enamel steel bottom vessel boiling water in about 7.5 minutes, vs. 24 minutes for the glass beaker, or a ratio of 3.2.

Example 12

A 250 ml polypropylene beaker was prepared as in previous examples with a polychlorotrifluorocthylene coated graphite bottom and a metal band applied by shrink fitting. A similar beaker was prepared except that a step was machined in the outer edge of the non-coated side of the bottom. The step was 0.03 in. deep and 0.1875 in. wide producing a heating means contacting surface which had a diameter of 2.62 in. in comparison to the service side surface which had a diameter of 3.00 in.

Both beakers were filled with 200 ml of water and placed on a hot plate at 920° F. The polypropylene between the metal band and the graphite bottom began to melt after 2 min. in the beaker not having the stepped bottom. The polypropylene was unaffected after 30 min. in the beaker having the stepped bottom. Thermocouples attached to the metal bands showed that the metal band for the non-stepped bottom beaker reached a temperature of 330° F. while the band for the stepped bottom beaker reached a temperature of only 280° F. The heating rate of the water in both beakers appeared to be roughly the same.

Example 13

1. An ETFE (polyethylene/tetrafluoroethylene) injection molded 250 ml beaker with an I.D. of 2.564 in. and an O.D. of 2.764 in., side wall thickness of 0.100 in. or (100 mils) was fitted with a graphite disc of bulk density 1.68 g/cc to which was laminated a 23.4 mil (0.0234 in.) thick polymethylpentene film reduced in thickness to 21.5 mils or (0.215 in.) after lamination. The vessel was prepared and evaluated in accordance with the previous examples.

Water boiling tests with this vessel and a similar glass vessel showed that the plastic vessel with the composite bottom brought the 200 ml of contained water to the boiling point in 15 minutes at a hot plate temperature of 465° F., compared to 30 minutes for the glass vessel, or half the time, using half the energy. With the cover removed from the glass vessel, it stopped boiling whereas the plastic vessel continued to boil the water although not as briskly.

If we compare this vessel to the other vessels in the examples, having thinner plastic film bottoms it can be seen that it requires a longer time to reach boiling, although it is still twice as energy efficient as the glass vessel.

Example 14

2. An ETFE beaker as in the above example 13 was fitted with a graphite bottom element to which was bonded, or laminated a 25 mil (0.025 in.) polychlorotrifluoro ethylene (PCTFE) film. The vessel was prepared and evaluated in accordance with the previous examples. The results showed that this vessel boiled water in 13 minutes compared to 30 minutes for a similar glass vessel or 2.5 times faster than glass, although again, not as efficient as the thinner films.

What is claimed is:

1. An energy efficient heating vessel having thermally insulative sidewalls of a plastic material, and a thermally conductive bottom, said bottom including:
   an inner film of a plastic material intergral with said sidewalls, said film being thin for minimal resistance to heat transfer but of sufficient substance as to be liquid impervious to separate liquid from said conductive bottom, and
   an outer layer of thermally conductive graphitic material in thermal contact with and supporting said inner film, and adapted for thermal contact with a heating surface,
   said vessel effective to transmit heat from said heating surface through said bottom to the contents of said vessel, and to retard the transfer of heat from said contents through said sidewalls, for enhanced efficiency of liquid heating.

2. An energy efficient heating vessel as defined in claim 1 in which said sidewalls and said inner film are of a thermoplastic material.

3. An energy efficient heating vessel is defined in claim 1 in which said inner film has a thermal resistivity $R_1$ and said outer layer has a thermal resistivity $R_2$, wherein the value $R_1$, is more than 10 times the value $R_2$.

4. An energy efficient heating vessel as defined in claim 1 in which said film is of the same material as said sidewalls and forms a continuous whole therewith.

5. An energy efficient heating vessel as defined in claim 1 in which said inner film is in sealed abutment against said sidewalls.

6. An energy efficient heating vessel as defined in claim 5 in which said inner film and said sidewalls are different plastic materials.

7. An energy efficient heating vessel as defined in claim 1 in which said innr film and said sidewalls are of plastic materials selected from the group consisting of polyfluorocarbons, polyolefins, polyetherimides, polyimides, polysulfones, polyether ether ketones, polyphenylene sulfides, polyether sulfones, polyarylsulfones, polycarbonates, phenolics, epoxies, nylons, polyesters.

8. An energy efficient heating vessel as defined in claim 7 in which said sidewalls and said inner film are selectively reinforced with fibrous material.

9. An energy efficient heating vessel as defined in claim 7 in which said sidewalls and said inner film are selectively reinforced with particulate material.

10. An energy efficient heating vessel as defined in claim 1 in which said thermally insulative sidewalls are molded to said thermally conductive bottom in sealing relationship therewith.

11. An energy efficient heating vessel as defined in claim 1 in which said thermally insulative sidewalls are fastened to said thermally conductive bottom by a compression ring disposed around the periphery of said vessel.

12. An energy efficient heating vessel as defined in claim 1 in which said graphitic material is a graphite based material.

* * * * *